US012770178B2

(12) United States Patent
Mesard et al.

(10) Patent No.: US 12,770,178 B2
(45) Date of Patent: Oct. 20, 2026

(54) MACHINE LEARNED MODEL FOR SELECTING ACTIONS FOR FULFILLING ORDER WITH OUT-OF-STOCK ITEMS

(71) Applicant: Maplebear Inc., San Francisco, CA (US)

(72) Inventors: Madeline Mesard, New York, NY (US); Brent Scheibelhut, Toronto (CA); Shaun Navin Maharaj, Vaughan (CA)

(73) Assignee: Maplebear Inc., San Francisco, CA (US)

( * ) Notice: Subject to any disclaimer, the term of this patent is extended or adjusted under 35 U.S.C. 154(b) by 242 days.

(21) Appl. No.: 18/634,762

(22) Filed: Apr. 12, 2024

(65) Prior Publication Data

US 2025/0322441 A1 Oct. 16, 2025

(51) Int. Cl.

| | |
|---|---|
| ***G06Q 30/00*** | (2023.01) |
| ***G06Q 10/0631*** | (2023.01) |
| ***G06Q 10/087*** | (2023.01) |
| ***G06Q 30/0601*** | (2023.01) |

(52) U.S. Cl.

CPC ... *G06Q 30/0631* (2013.01); *G06Q 10/06311* (2013.01); *G06Q 10/087* (2013.01)

(58) Field of Classification Search

CPC ................................................ G06Q 30/06–08

See application file for complete search history.

(56) References Cited

U.S. PATENT DOCUMENTS

| | | | | |
|---|---|---|---|---|
| 9,268,458 | B1 * | 2/2016 | Siegel | G06F 3/0481 |
| 2019/0311210 | A1 * | 10/2019 | Chatterjee | G06F 40/279 |
| 2022/0092670 | A1 * | 3/2022 | Laserson | G06F 40/242 |
| 2023/0237552 | A1 * | 7/2023 | Arrabothu | G06Q 30/0633 705/26.7 |
| 2025/0045813 | A1 * | 2/2025 | Bowen | G06Q 30/0635 |
| 2025/0292310 | A1 * | 9/2025 | Rakshit | G06Q 30/0643 |

OTHER PUBLICATIONS

Maitra, Sarit et al., "Backorder Prediction in Inventory Management: Classification Techniques and Cost Considerations", arXiv: 2309.13837v2 [cs.L] (Year: 2023).*

* cited by examiner

*Primary Examiner* — Ethan D Civan
(74) *Attorney, Agent, or Firm* — Fenwick & West LLP

(57) ABSTRACT

An online system for determining quality improvement actions responsive to an item being unavailable at source location after an order was placed. The system receives an indication from a picker client device that a requested item from an order to be fulfilled at a source location is unavailable at the source location. The system retrieves model inputs based in part on the indication. The model inputs may include availability information for the requested item at least one other source location, a foundational item status of the requested item, and a tenure of the user. The system determines a quality improvement action for the requested item using a machine learned model (an order quality model) and the model inputs. The system performs the determined quality improvement action.

20 Claims, 8 Drawing Sheets

400

MACHINE LEARNED MODEL FOR SELECTING ACTIONS FOR FULFILLING ORDER WITH OUT-OF-STOCK ITEMS

BACKGROUND

Out of stock items can be detrimental to user satisfaction of online orders. Particularly in cases where an order has already been placed, and it is discovered later that an item in the order is actually out of stock. Conventionally, if an item is out of stock, options generally include substituting the item with something else, or to refund the item and not receive it. When a user places an order, they often have specific needs in mind, so when an order isn't fulfilled in its entirety, users may be unsatisfied with the service, have to supplement their shop by going themselves, etc.

SUMMARY

In accordance with one or more aspects of the disclosure, a machine learned model (order quality model) is described for determining quality improvement actions. An online system may determine a quality improvement action responsive to an item being unavailable at source location after an order was placed. The online system may receive an indication from a picker client device that a requested item from an order to be fulfilled at a source location is unavailable at the source location. In another embodiment, the online system may receive the indication from a source computing system (e.g., retailer computing system or consumer packaged goods warehouse computing system) associated with the source location. For example, the item may have been available at the source location when the order was placed, but for some reason subsequent to the order became unavailable at the source location. The online system retrieves model inputs (e.g., availability information for the requested item at least one other source location, a foundational item status of the requested item, and a tenure of the user) based in part on the indication. The online system determines a quality improvement action for the requested item using a machine learned model (an order quality model) and the model inputs. The online system may instruct the user client device to display a message that describes the quality improvement action. For example, the message may be "Some of your items were missing, so we're sending Charlie D. to get the rest of them!" The online system performs the determined quality improvement action.

In some aspects, the techniques described herein relate to a method, performed at a computer system including a processor and a non-transitory computer readable medium, including: receiving an indication from a picker client device that a requested item from an order to be fulfilled at a source location is unavailable at the source location, wherein the order is associated with a user; retrieving model inputs based in part on the indication, wherein the model inputs include availability information for the requested item at least one other source location, a foundational item status of the requested item, and a tenure of the user; determining a quality improvement action for the requested item using an order quality model and the model inputs, wherein the order quality model is a machine learned model that was trained by: accessing a set of training examples including appeasement training data, picker fulfillment training data, user satisfaction training data, and user tenure training data, applying the order quality model to the set of training examples to generate a training output corresponding to a predicted quality improvement action, back-propagating one or more error terms obtained from one or more loss functions to update a set of parameters of the order quality model, and one or more of the error terms are based on a difference between a label applied to a test interaction of the set of training examples and the predicted quality improvement action, and stopping the back-propagation after the one or more loss functions satisfy one or more criteria; and performing the quality improvement action.

In some aspects, the techniques described herein relate to a computer program product including a non-transitory computer readable storage medium having instructions encoded thereon that, when executed by a processor of a computer system, cause the computer system to: receive an indication from a picker client device that a requested item from an order to be fulfilled at a source location is unavailable at the source location, wherein the order is associated with a user; retrieve model inputs based in part on the indication, wherein the model inputs include availability information for the requested item at least one other source location, a foundational item status of the requested item, and a tenure of the user; determine a quality improvement action for the requested item using an order quality model and the model inputs, wherein the order quality model is a machine learned model that was trained by: accessing a set of training examples including appeasement training data, picker fulfillment training data, user satisfaction training data, and user tenure training data, applying the order quality model to the set of training examples to generate a training output corresponding to a predicted quality improvement action, back-propagating one or more error terms obtained from one or more loss functions to update a set of parameters of the order quality model, and one or more of the error terms are based on a difference between a label applied to a test interaction of the set of training examples and the predicted quality improvement action, and stopping the back-propagation after the one or more loss functions satisfy one or more criteria; and perform the quality improvement action.

In some aspects, the techniques described herein relate to a computer system including: a processor; and a non-transitory computer readable storage medium having instructions encoded thereon that, when executed by the processor, cause the processor to: receive an indication from a picker client device that a requested item from an order to be fulfilled at a source location is unavailable at the source location, wherein the order is associated with a user, retrieve model inputs based in part on the indication, wherein the model inputs include availability information for the requested item at least one other source location, a foundational item status of the requested item, and a tenure of the user, determine a quality improvement action for the requested item using an order quality model and the model inputs, wherein the order quality model is a machine learned model that was trained by: accessing a set of training examples including appeasement training data, picker fulfillment training data, user satisfaction training data, and user tenure training data, applying the order quality model to the set of training examples to generate a training output corresponding to a predicted quality improvement action, back-propagating one or more error terms obtained from one or more loss functions to update a set of parameters of the order quality model, and one or more of the error terms are based on a difference between a label applied to a test interaction of the set of training examples and the predicted quality improvement action, and stopping the back-propagation after the one or more loss functions satisfy one or more criteria, and perform the quality improvement action.

DETAILED DESCRIPTION

Figure 1:
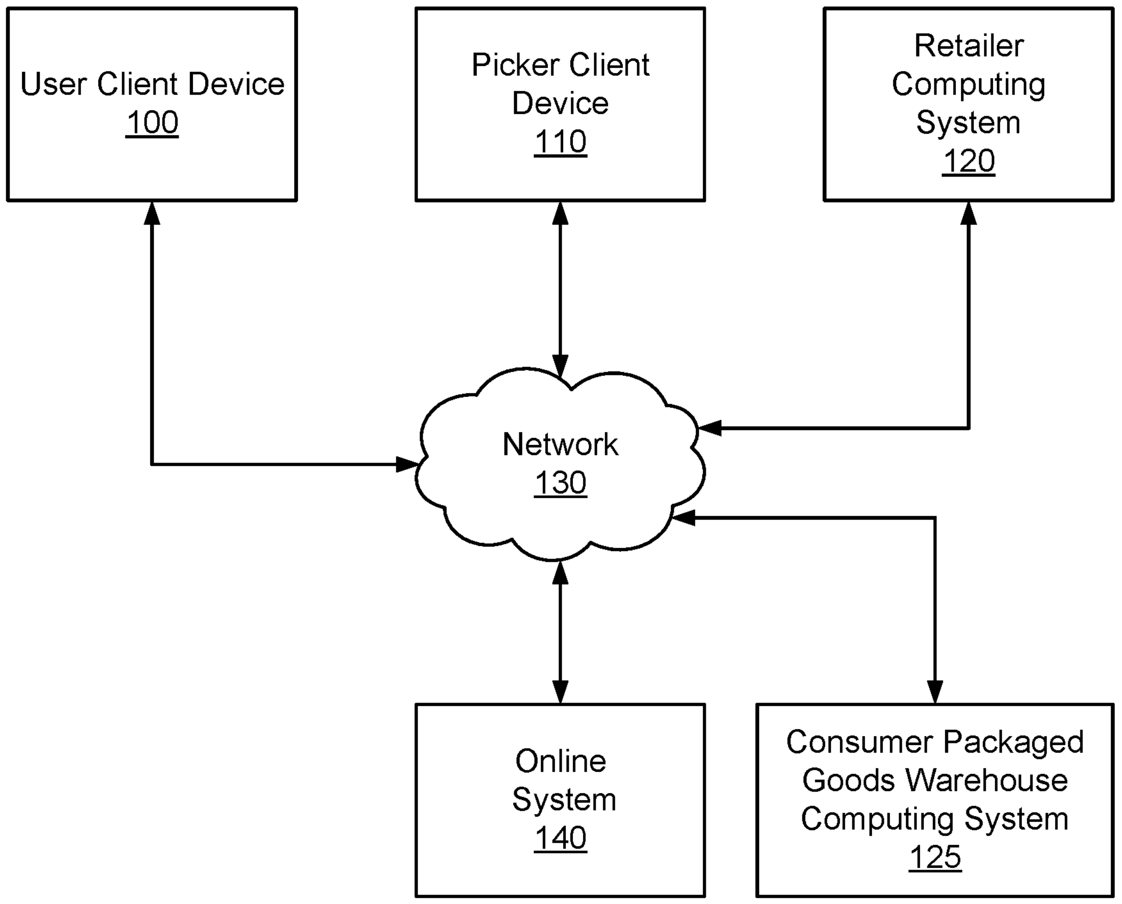
FIG. 1 illustrates an example system environment for an online system, in accordance with one or more embodiments.

FIG. 1 illustrates an example system environment for an online system 140, in accordance with one or more embodiments. In some embodiments, the online system 140 may be an online concierge system. The system environment illustrated in FIG. 1 includes a user client device 100, a picker client device 110, a retailer computing system 120, a consumer packaged goods (CPG) warehouse computing system 125, a network 130, and the online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, users, pickers, retailers, and CPG warehouses may be generically referred to as "users" of the online system 140. Additionally, while one user client device 100, picker client device 110, CPG warehouse computing system 125, and retailer computing system 120 are illustrated in FIG. 1, any number of users, pickers, CPG warehouses and retailers may interact with the online system 140. As such, there may be more than one user client device 100, picker client device 110, retailer computing system 120, CPG warehouse computing system 125, or some combination thereof.

The user client device 100 is a client device through which a user may interact with the picker client device 110, the retailer computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected. The ordering interface may present messages from the online system 140.

The user client device 100 may receive additional content from the online system 140 to present to a user. For example, the user client device 100 may receive incentives, coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, the CPG warehouse computing system 125, the online system 140, or some combination thereof. The picker client device 110 can be a personal or mobile computing device, such as a smartphone, a tablet, a laptop computer, or desktop computer. In some embodiments, the picker client device 110 executes a client application that uses an application programming interface (API) to communicate with the online system 140.

The picker client device 110 receives orders from the online system 140 for the picker to service. A picker may service an order by collecting the items listed in the order from one or more source locations (e.g., a retailer location or a CPG warehouse location) as described in the order. The picker client device 110 presents the items that are included in the user's order to the picker in a collection interface. The collection interface is a user interface that provides information to the picker on which items to collect for a user's order, and from which source location to collect them.

In some embodiments, an order may be for items from a source location, and the picker may discover that an item that is part of the order is not available at the source location (e.g., the item is out-of-stock). The picker may communicate the lack of availability of the item to the online system 140, and receive instructions how to proceed (e.g., via the collection interface) regarding the item from the online system. For example, in some embodiments, the collection interface may instruct the picker to collect items from the order that are available at the source location, and collect the item that is not available at the source location from a different source location. Alternatively, the collection interface may adjust the order to be fulfilled by the picker to include only the items that are available at the source location. In these cases, the item that was unavailable may be addressed via appeasement (e.g., refund of money for the item, incentive, etc.) or having another picker go to another source location to obtain the missing item for the user.

In some embodiments, the collection interface provides multiple orders from multiple users for the picker to service at the same time from the same source location. The collection interface further presents instructions that the user may have included related to the collection of items in the order. Additionally, the collection interface may present a location of each item in the source location (e.g., retailer location or CPG warehouse location), and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the source location to receive the weight of an item.

When the picker has collected all of the items that are assigned to the picker from an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. Where a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user such that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

The retailer computing system 120 is a computing system operated by a retailer that interacts with the online system 140. As used herein, a "retailer" is an entity that operates a "retailer location," which is a store, warehouse, or other building from which a picker can collect retail items. The retailer computing system 120 stores and provides item data to the online system 140 and may regularly update the online system 140 with updated item data. For example, the retailer computing system 120 provides item data indicating which items are available at a retailer location and the quantities of those items. Additionally, the retailer computing system 120 may transmit updated item data to the online system 140 when an item is no longer available at the retailer location. Additionally, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a user's order (e.g., as a commission).

The CPG warehouse computing system 125 is a computing system operated by a CPG warehouse that interacts with the online system 140. Note in some embodiments the CPG warehouse computing system 125 or the retailer computing system 120 may be referred to as a source computing system, and a retailer or a CPG warehouse may be referred to as a source. As used herein, a "CPG warehouse" is an entity that operates a "CPG warehouse location," which is a warehouse, or other building from which a picker can collect items. The CPG warehouses stock large quantities of items that are distributed in a business-to-business fashion to retailer locations and/or users for sale. As described herein, for bulk orders of an item, the CPG warehouse computing system 125 may allow pickers to directly source items from a CPG warehouse that stocks that item for distribution. The CPG warehouse computing system 125 stores and provides item data to the online system 140 and may regularly update the online system 140 with updated item data. For example, the CPG warehouse computing system 125 provides item data indicating which items are available at a CPG warehouse location and the quantities of those items. Additionally, the CPG warehouse computing system 125 may transmit updated item data to the online system 140 when an item is no longer available at the CPG warehouse location. Additionally, the CPG warehouse computing system 125 may provide the online system 140 with updated item prices, sales, or availabilities. Additionally, the CPG warehouse computing system 125 may receive payment information from the online system 140 for orders serviced by the online system 140. Alternatively, the CPG warehouse computing system 125 may provide payment to the online system 140 for some portion of the overall cost of a user's order (e.g., as a commission).

The user client device 100, the picker client device 110, the retailer computing system 120, the CPG warehouse computing system 125, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from one or more retailers, one or more CPG warehouses, or some combination thereof. The online system 140 receives orders from a user client device 100 through the network 130. The online system 140 selects a picker to service the user's order and transmits the order to the picker client device 110 that is associated with the picker.

In some embodiments, the online system 140 may receive an indication (e.g., from the picker client device 110 and/or a source computing system) that a requested item from an order to be fulfilled at a source location is unavailable at the source location. The online system 140 may retrieve model inputs (e.g., availability information for the requested item at least one other source location, a foundational item status of the requested item, and a tenure of the user) based in part on the indication. Methods for classifying an item as "foundational" in an order are described in U.S. application Ser. No. 17/846,887, filed Jun. 22, 2022, which is hereby incorporated in its entirety. The online system 140 may determine a quality improvement action for the requested item using an order quality model and the model inputs. The quality improvement action is an action that attempts to maintain or increase user satisfaction in orders where an item of the order is missing from the source location requested in the order. A quality improvement action may be, e.g., instructing the picker to obtain the item from a different source location, adjusting the portion of the order to be fulfilled by the picker to include only the items that are available at the source location, instructing a different picker to obtain the item from a different source location, providing one or more appeasements (e.g., discount, coupon, incentive, refund, etc.) to the user due to the item missing from the order, or some combination thereof. The online system 140 performs the quality improvement action.

The one or more pickers may collect their portion of the order from one or more source locations (e.g., retailer location, CPG warehouse) and deliver the ordered items to the user (or in some case a picker to deliver a consolidated order to the user). The online system 140 is described in further detail below with regards to FIG. 2.

Figure 2:
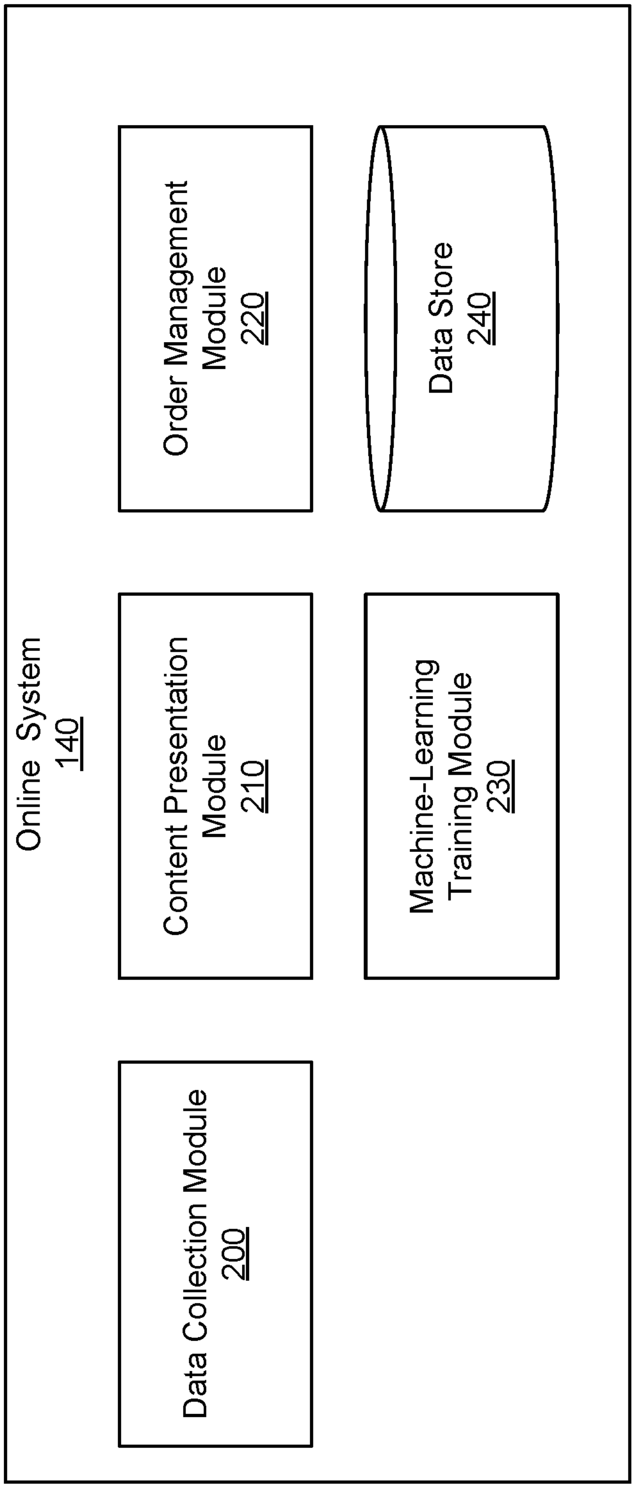
FIG. 2 illustrates an example system architecture for an online system, in accordance with one or more embodiments.

FIG. 2 illustrates an example system architecture for the online system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, shopping history, user tenure data (e.g., how frequent the user has made orders, how long they have been a user, etc.), favorite items, or stored payment instruments. The user data also may include default settings established by the user, such as a default retailer/retailer location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location (e.g., retailer location, a CPG warehouse location). The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from the retailer computing system 120, the CPG warehouse computing system 125, the picker client device 110, the user client device 100, or some combination thereof.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has services orders for the online system 140, a user rating for the picker, vehicle type of the picker (e.g., bicycle, make/model of car, etc.), size of available cargo space in a vehicle of the picker, picker efficiency score, which sources (e.g., retailers and/or CPG warehouses) the picker has collected items at, or the picker's previous shopping history. The picker efficiency score gauges a picker's ability to fulfill the order quickly and accurately. The data collection module 200 may calculate the picker efficiency store by evaluating their familiarity with store layouts, product categories, and operational speed. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may also include information describing actions taken by the online system 140 to mitigate unavailable items at source locations requested in an order. For example, the order data may include appeasement data, picker fulfillment data, when the order was delivered, user satisfaction data (e.g., a rating that the user gave the delivery of the order), or some combination thereof. Appeasement data describes an action (e.g., refund cost for the item, provide discount, etc.) taken by the online system to appease a user for a requested item being unavailable at a requested source location. The picker fulfillment data describes how many pickers were used to fulfill an order, and may include information describing which picker (s) serviced the order.

The content presentation module 210 selects content for presentation to a user. For example, the content presentation module 210 selects which items to present to a user while the user is placing an order. The content presentation module 210 generates and transmits the ordering interface for the user to order items. The content presentation module 210 populates the ordering interface with items that the user may select for adding to their order. In some embodiments, the content presentation module 210 presents a catalog (e.g., an online catalog) of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine learning models and may be stored in the data store 240.

In some embodiments, the content presentation module 210 scores items based on a search query received from the user client device 100. A search query is text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 may filter out items from presentation to a user based on whether the predicted availability of the item exceeds a threshold.

In some embodiments, the content presentation module 210 may instruct the user client device 100 to present (e.g., as part of the ordering interface) an option to the user that pre-authorizes payment for additional costs. The additional costs may be, e.g., to cover secondary fulfillment (e.g., an item requested in the order of the user ends up being unavailable at the requested source location, and the picker or another picker has to go to another source location to obtain the item).

The order management module 220 manages orders for items from users. The order management module 220 receives orders from a user client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 may determine a foundational item status for some or all of the items of an order. A foundational item status indicates whether or not an item is a foundational item for an order. A foundational item is an item that is essential to the order. For example, if the order was to provide ingredients for spaghetti and meatballs, spaghetti could be a foundational item for that order, whereas nacho cheese would not be a foundational item for that order. The order management module 220 may use a machine learned model (e.g., a foundational item model) to determine foundational item statuses for items of the order (e.g., which items, if any, are essential to an order). The order management module 220 may apply the list of items in the order to the foundational item model, and the foundational item model may output a foundational item status for each of the items of the order.

The foundational item status may be useful to, e.g., prioritize items for orders where they are a foundational item versus, e.g., a nice to have item. For example, given a first order and a second order that both include an item from a source location. The order management module 220 may determine the foundational item status of the item for each order. In cases where the item is a foundational item in the first order, but not in the second order, the order management module 220 may prioritize fulfillment of the requested item for the first order over fulfillment of the requested item for the second order. The order management module 220 may prioritize fulfillment by, e.g., reserving the item at a source location where the item is to be sourced as part of the first order.

In some embodiments, the order management module 220 determines when to assign an order to a picker based on a delivery timeframe requested by the user with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected.

In some embodiments, the order management module 220 may receive, after the user has already placed an order to be fulfilled at a source location, an indication that a requested item from the order is unavailable at the source location. For example, the picker may discover that the requested item is unavailable at the requested source location, and use the picker client device 110 to provide the indication to the online system 140.

The order management module 220 may retrieve model inputs for use in an order quality model. The model inputs may include, e.g., availability information for the requested item at least one other source location, a foundational item status of the requested item, a tenure of the user, item data (e.g., showing availability at nearby source locations), source locations with a threshold distance to a delivery location for the order, cargo spaces available to pickers, cost of transporting the missing item, replacement item availability, some other input relevant to the order quality model, or some combination thereof.

In some embodiments, the order management module 220 may determine replacement item availability for the requested item. The order management module 220 may apply the requested item to a replacement model to identify one or more items that may be suitable to replace the requested item and are available at the source location. For example, the replacement model may suggest replacing beefsteak tomatoes (requested item that was unavailable at the source location) with Roma tomatoes (that are available at the source location).

The order management module 220 may determine a quality improvement action for the requested item using the order quality model and one or more of the model inputs.

The quality improvement action is an action that attempts to maintain or increase user satisfaction in cases where an item of the order is missing from the source location requested in the order. A quality improvement action may be, e.g., instructing the picker to obtain the item from a different source location, adjusting the portion of the order to be fulfilled by the picker to include only the items that are available at the source location, instructing a different picker to obtain the item from a different source location, providing one or more appeasements (e.g., discount, refund, etc.) to the user due to the item missing from the order, or some combination thereof. The order management module 220 performs the quality improvement action output from the order quality model. Note that costs incurred in retrieving the item may be absorbed by the online system 140 (except in embodiments where the user has expressly pre-authorized payment for secondary fulfillment). In this manner, the order management module 220 helps ensure user satisfaction for orders.

In some embodiments, the order quality model generates a plurality of quality improvement actions that each have a respective quality score. A quality score for a given quality improvement action may be based on a cost to perform the given quality improvement action, a predicted user satisfaction for performing the given quality improvement action, a foundational item status of the item, user tenure (e.g., how frequent the user has made orders, how long they have been a user), or some combination thereof. The cost may be based on cost to fulfill the request for the requested item at a second source location. The predicted user satisfaction can describe a likelihood that the user places an order in the future. The order quality model may rank the plurality of quality improvement actions based in part on their respective quality score, and select the quality improvement action based in part on the ranking.

In some embodiments, the order management module 220 may instruct the user client device 100 to display (e.g., via the ordering interface) a message that describes the quality improvement action. For example, the message may be "Some of your items were missing, so we're sending Charlie D. to get the rest of them!" Or in cases where the quality improvement action is an appeasement, the message may be, e.g., "Some of your items were missing, so we are refunding that portion of your order."

Note that an order is associated with a requested source location, and the source location is associated with a source that may have other source locations. In some embodiments, the order quality model may prioritize source locations associated with the same source that is associated with the requested source location. For example, an order may request items from Farmers' Market at 506 Main Street in Anacortes, Washington, and a picker servicing the order discovered that an item from the order was not available at that location. In determining potential quality improvement actions for obtaining the missing item, the order quality model may prioritize another nearby location of the Farmers' Market where the item is available over another source (e.g., Bob's Grocer) in Anacortes where the item is also available.

For example, the order management module 220 may determine availability of a requested item at a first source location that is part of a same retailer as the source location. The order management module 220 may determine availability of the requested item at a second source location that is not part of the retailer. The determined availability may be input (as part of the model inputs) to the order quality model. The order quality model may weigh the first source location more than the second source location, and adjust the weighting of the first source location and the weighting of the second source location based on their respective locations from a picker location. The order quality model may select a source location from the first source location and the second source location that has the lowest based on the adjusted weightings. For example, if both source locations are roughly a same distance from the picker location, the order quality model may select the first source location to obtain the missing item.

In some embodiments where the quality improvement action is to have the requested item sourced from a second source location, the order quality model may mitigate instances of selecting a second source location where the requested item is a loss leader for the second source location. For example, the pool of potential second source locations may be weighted such that given a second source location where the item is a loss leader and another second source location where the item is not a loss leader that are roughly equidistant from the picker, the order quality model selects the second source location where the item is not a loss leader for the picker to obtain the requested item.

When the order management module 220 determines that the picker has completed the portion of the order assigned to that picker, the order management module 220 transmits the delivery location for the order to the picker client device 110. In embodiments where multiple pickers are used to fulfill the order (e.g., one picker obtains items at a source location requested by the user in the order, and a second picker obtains any missing items from an alternate source location), one picker may provide the other picker with their portion of the order to facilitate a single delivery to the user. In other embodiments where multiple pickers are used to fulfill the order, there may be a plurality of deliveries (e.g., one performed by each picker).

The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of their order. In some embodiments, the order management module 220 computes an estimated time of arrival for the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine learning training module 230 trains machine learning models used by the online system 140. The online system 140 may use machine learning models (e.g., the order quality model, the foundational item model, the replacement model) to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include user data, picker data, item data, order data, or some combination thereof. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

For example, the machine learning training module 230 may train the order quality model by accessing a set of training examples. The set of training examples may include, e.g., order data, item data, user data, etc., that is used as training data. For example, the set of training examples may include, appeasement training data, picker fulfillment training data, user tenure training data, and user satisfaction training data. The machine learning training module 230 may apply the order quality model to the set of training examples to generate a training output corresponding to a predicted quality improvement action. The machine learning training module 230 may back-propagate one or more error terms obtained from one or more loss functions to update a set of parameters of the order quality model, and one or more of the error terms are based on a difference between a label applied to a test interaction of the set of training examples and the predicted quality improvement action. The machine learning training module 230 may stop the back-propagation after the one or more loss functions satisfy one or more criteria.

In some embodiments, the machine learning training module 230 may re-train some or all of the machine learned models used by the online system 140. For example, given an order where an item ended up not being available at a source location of the order, and a performance improvement action occurred. The online system 140 may receive user feedback on the order. The machine learning training module 230 may update the quality improvement model based in part on the performed quality improvement action and the user feedback.

The data store 240 stores data used by the online system 140. For example, the data store 240 stores user data, item data (e.g., user tenure data), order data (e.g., appeasement data, picker fulfillment data, and user satisfaction data), foundational item statuses for items of orders, model inputs, and picker data for use by the online system 140. The data store 240 also stores trained machine learning models (e.g., the order quality model, the foundational item model, the replacement model) trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3A:
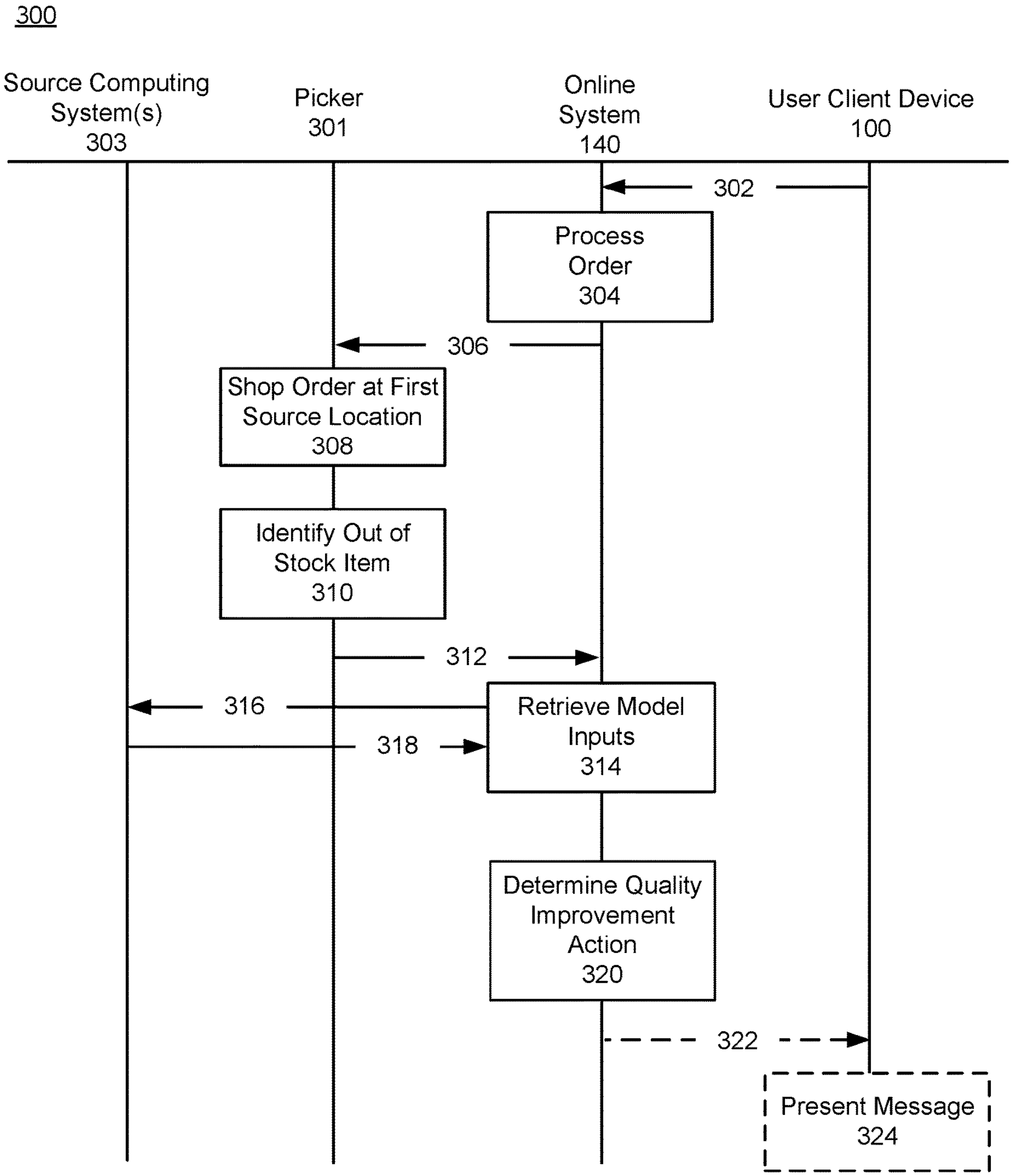
FIG. 3A is an example sequence diagram describing using an order quality model to determine a quality improvement action, in accordance with some embodiments.

FIG. 3A is an example sequence diagram 300 describing using an order quality model to determine a quality improvement action, in accordance with some embodiments. Alternative embodiments may include more, fewer, or different interactions from those illustrated in FIG. 3A, and the steps may be performed in a different order from that illustrated in FIG. 3A.

The user client device 100 provides 302 an order to the online system 140. A user associated with the user client device 100 may generate the order. The order is for one or more items from a source location (e.g., Bob's Grocer on 123 Main Street in Anacortes, WA).

The online system 140 processes 304 the order by identifying a picker 301 associated with the picker client device 110 to shop for the order at the requested source location. The online system 140 may, e.g., identify the picker 301 from a pool of pickers based on their locations relative to the requested source location, available cargo capacities of their vehicles, picker efficiency scores, size and number of requested items, etc. The online system 140 assigns the picker 301 to handle the order. The online system 140 provides 306 the assignment of the order to a picker client device 110 associated with the picker 301.

The picker 301 shops 308 the order at the requested source location. The picker 301 gathers the one or more items of the order from the requested source location. In the illustrated embodiments, the picker 301 identifies 310 an item from the order that is out-of-stock at the source location. This item may be referred to as a requested item. The picker 301 notifies 312 the online system 140 of the requested item using the picker client device 110.

The online system 140 retrieves 314 model inputs. For example, the online system may request 316 availability information for the requested item from one or more source computing systems 303. The one or more source computing systems 303 provide 318 the updated availability information for the requested item to the online system 140. The online system 140 may also determine a foundational item status for the requested item using, e.g., the one or more items from the order and a foundational item model. In some embodiments, the online system 140 may retrieve model inputs (e.g., user tenure data for the user) from a data store (e.g., the data store 240).

The online system 140 may determine 320 a quality improvement action for the missing item using an order quality model and the model inputs. The quality improvement action may be, e.g., instructing a different picker to obtain the item from a different source location and adjusting the portion of the order to be fulfilled by the picker to include only the items that are available at the source location (e.g., as described below with regard to FIG. 3B); instructing the picker to obtain the item from a different source location (e.g., as described below with regard to FIG. 3C); adjusting the portion of the order to be fulfilled by the picker to include only the items that are available at the source location and providing an appeasement to the user (e.g., as described below with regard to FIG. 3D).

In some embodiments, the online system 140 may instruct 322 the user client device 100 to display (e.g., via the ordering interface) a message that describes the quality improvement action. For example, the message may be "Some of your items were missing, so we're sending Charlie D. to get the rest of them!" The user client device 100 may then present 324 the message.

Figure 3B:
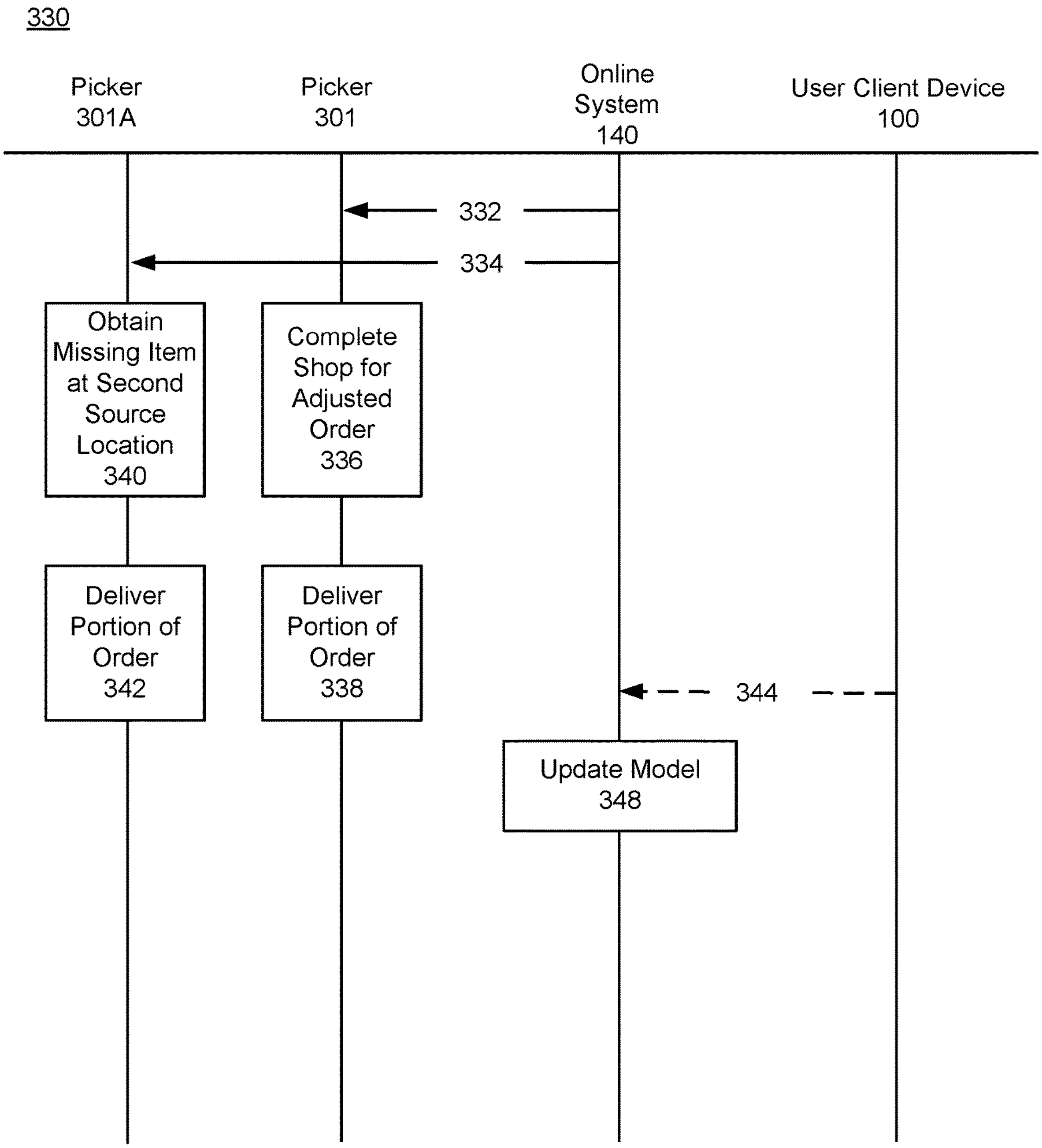
FIG. 3B is an example sequence diagram describing a quality improvement action that uses multiple pickers, in accordance with some embodiments.

FIG. 3B is an example sequence diagram 330 describing a quality improvement action that uses multiple pickers, in accordance with some embodiments. The sequence diagram 330 illustrates steps that occur after a quality improvement action has been determined (e.g., as shown in FIG. 3A). Alternative embodiments may include more, fewer, or different interactions from those illustrated in FIG. 3B, and the steps may be performed in a different order from that illustrated in FIG. 3B.

In the illustrated example, the quality improvement action is to use multiple pickers (i.e., the picker 301 and a picker 301A) and multiple source locations to fulfill the order. The online system 140 adjusts 332 the portion of the order to be fulfilled by the picker 301 to include only the items that are available at the source location. The online system 140 also instructs 334 the picker 301A to obtain the missing item at a second source location.

The picker 301 completes 336 the shop for the adjusted order at the source location. The picker 301 may then deliver 338 the items obtained from the source location to a delivery location (e.g., as specified in the adjusted order). The picker 301A obtains 340 the missing item at the second source location. The picker 301A may then deliver 342 the items obtained from the source location to a delivery location (e.g., as specified in the adjusted order). In some embodiments, the delivery location is the same delivery location of the picker 301. In some embodiments, the picker 301A may be instructed to deliver the missing item to the picker 301 for delivery.

The user may provide 344 feedback to the online system 140 regarding the order. For example, the user may provide a rating describing how satisfied they are with the delivery, items, etc. The online system 140 may update 348 the order quality model based in part on the received rating and the performed quality improvement actions.

Figure 3C:
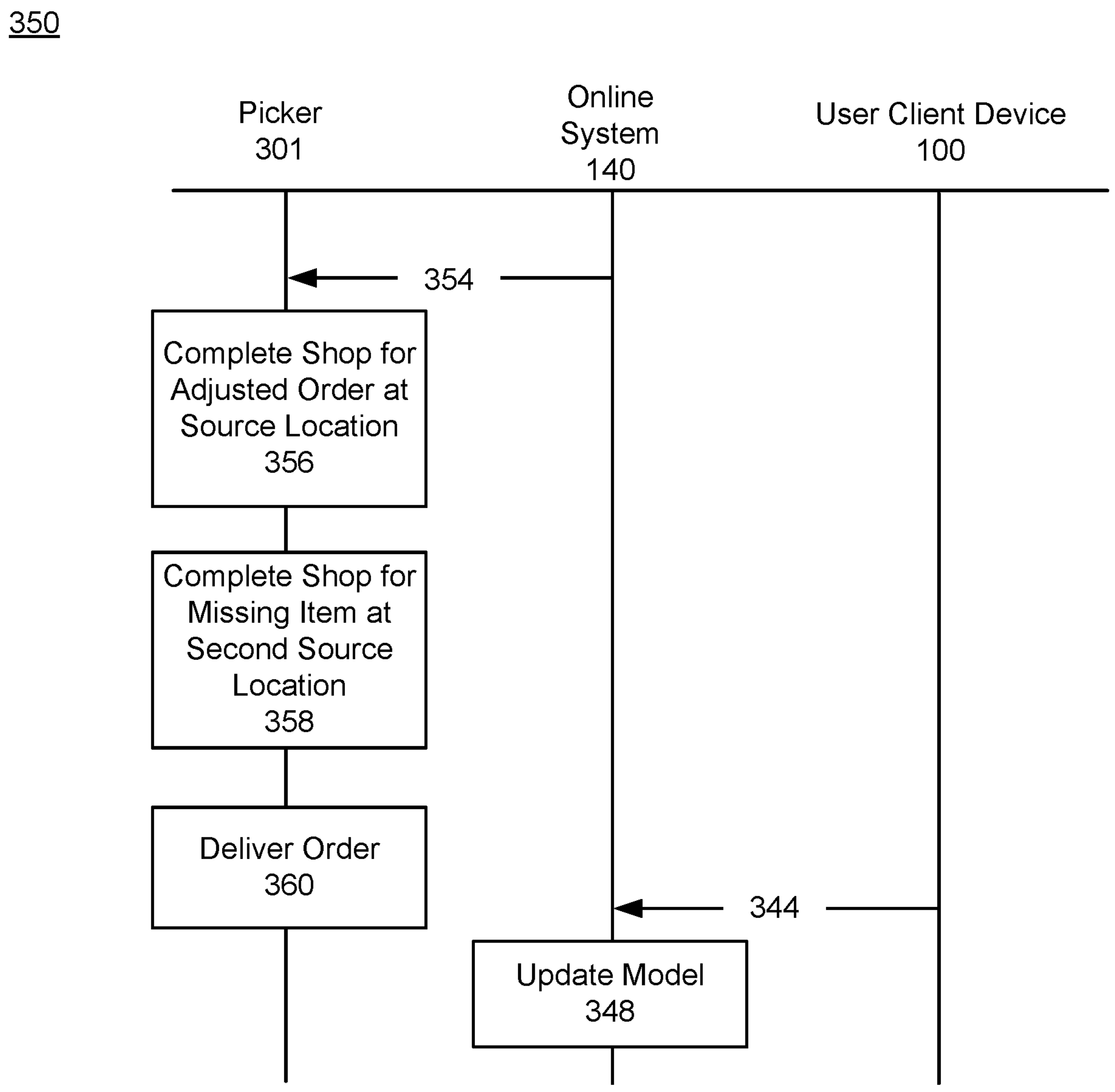
FIG. 3C is an example sequence diagram describing a quality improvement action that uses a single picker, in accordance with some embodiments.

FIG. 3C is an example sequence diagram 350 describing a quality improvement action that uses a single picker, in accordance with some embodiments. The sequence diagram 350 illustrates steps that occur after a quality improvement action has been determined (e.g., as shown in FIG. 3A). Alternative embodiments may include more, fewer, or different interactions from those illustrated in FIG. 3C, and the steps may be performed in a different order from that illustrated in FIG. 3C.

In the illustrated example, the quality improvement action is to use the picker 301 and multiple sources to fulfill the order. The online system 140 adjusts 354 the order such that the missing item is to be fulfilled at a second source location.

The picker 301 completes 356 the shop for the adjusted order at the source location. The picker 301 then relocates to the second source location, and completes 358 the shop for the missing item at the second location. The picker 301 may then deliver 360 the items obtained from the source location and the second source location to a delivery location. In some embodiments, the picker 301A may be instructed to deliver the missing item to another picker for delivery. Steps 344 and 348 are similar to that described above regarding FIG. 3B.

Figure 3D:
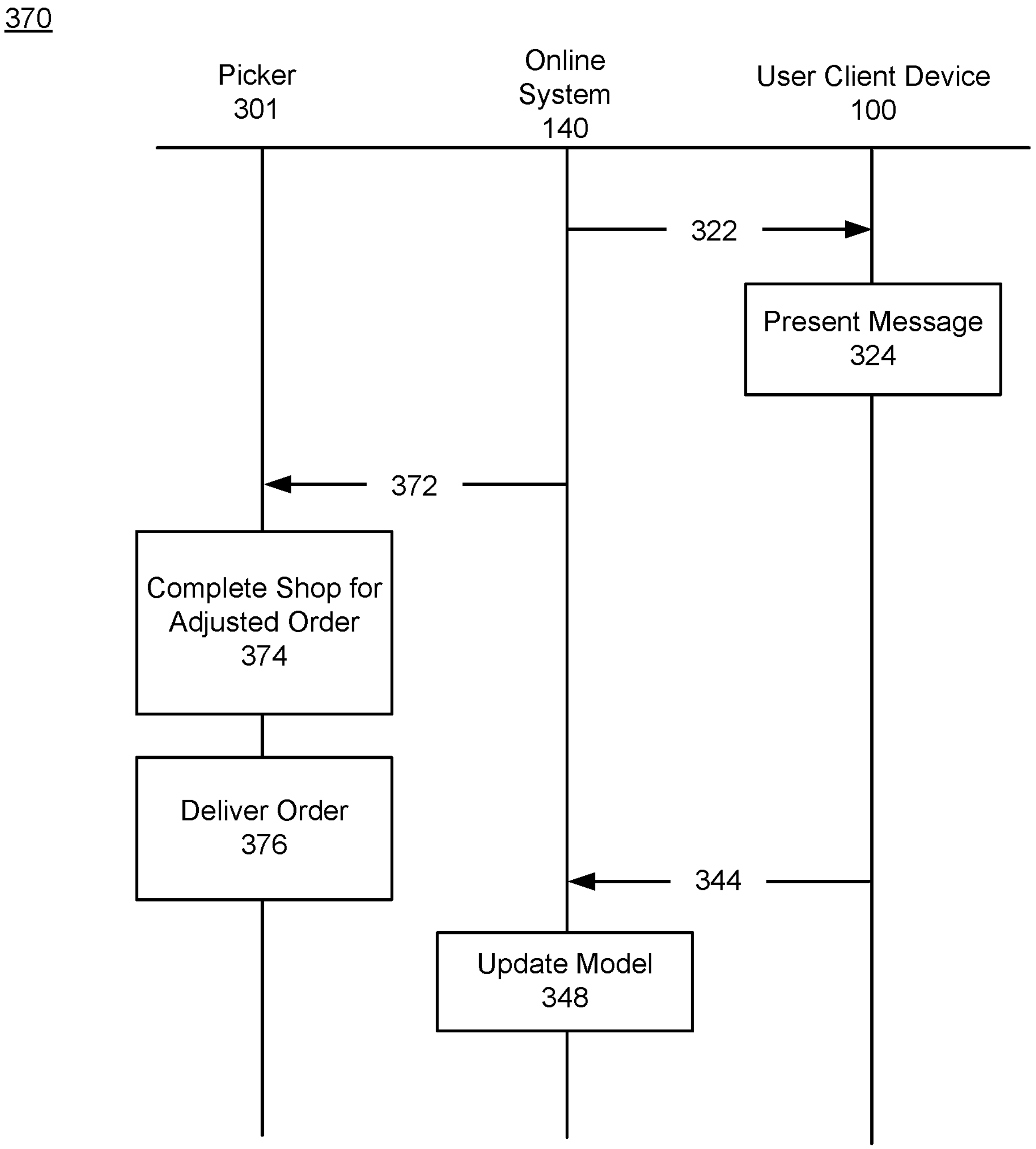
FIG. 3D is an example sequence diagram describing a quality improvement action that uses a single picker and an appeasement, in accordance with some embodiments.

FIG. 3D is an example sequence diagram 370 describing a quality improvement action that uses a single picker and an appeasement, in accordance with some embodiments. The sequence diagram 370 illustrates steps that occur after a quality improvement action has been determined (e.g., as shown in FIG. 3A). Alternative embodiments may include more, fewer, or different interactions from those illustrated in FIG. 3D, and the steps may be performed in a different order from that illustrated in FIG. 3D.

In the illustrated example, the quality improvement action is to use the picker 301 and an appeasement to fulfill the order. The online system 140 may instruct 322 the user client device 100 to display (e.g., via the ordering interface) a message that describes the appeasement. For example, the message may be "Some of your items were missing, so we are refunding that portion of your order." The user client device 100 may then present 324 the message.

The online system 140 adjusts 372 the order such that the missing item is removed from the order being fulfilled by the picker 301. The picker 301 completes 374 the shop for the adjusted order at the source location. The picker 301 may then deliver 376 the items obtained from the source location to a delivery location. Steps 344 and 348 are similar to that described above regarding FIG. 3B.

Figure 4:
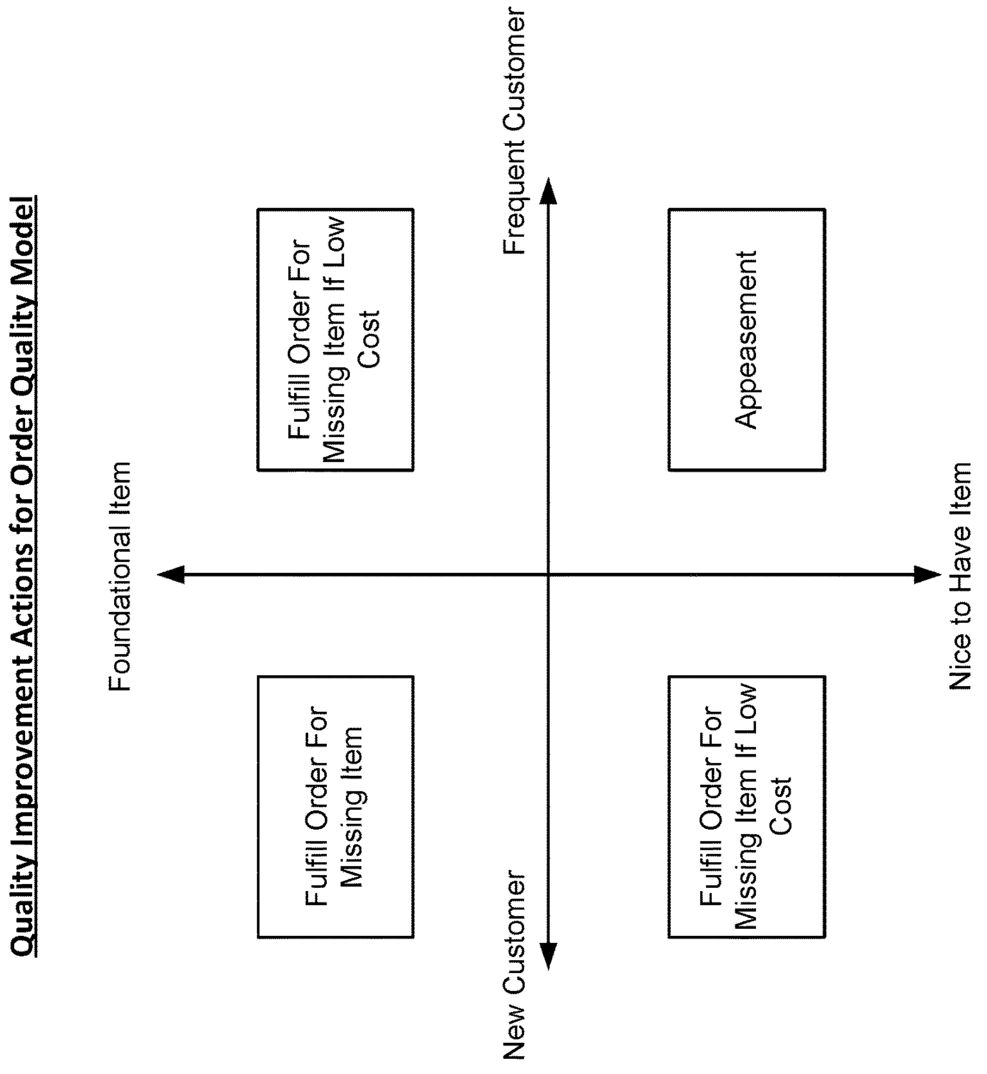
FIG. 4 is an example diagram describing a weighting used by an order quality model in determining a quality improvement action, in accordance with some embodiments.

FIG. 4 is an example diagram 400 describing a weighting used by an order quality model in determining a quality improvement action, in accordance with some embodiments. The order quality model may be the order quality model described above with regard to FIGS. 1-3D. Alternative embodiments may include more, fewer, or different factors from those illustrated in FIG. 4.

In some embodiments, the order quality model may prioritize fulfillment of an item missing from a source location based in part on foundational item status (e.g., whether an item is a foundational item or a nice to have item) and user tenure data (e.g., user is new or a frequent user). A nice to have item is an item that is not essential to the order. The order quality model may be trained in a manner that prioritizes complete fulfillment of orders for new users. This can help facilitate a positive experience for the user and increase a likelihood of them placing an order in the future. In contrast, frequent users may be more accepting of receiving an appeasement in lieu of fulfilling the order including the missing item.

In the illustrated embodiment, the order quality model generates a quality improvement action that includes obtaining the missing item if the item is a foundational item and the user is a new or relatively new user. In this case, the online system 140 may absorb the cost of assigning a second picker to obtain the missing item from a second location and deliver the missing item, or absorb additional costs associated with having the assigned picker go to the second source location to obtain the missing item. As the entire order is delivered, and it may be at no additional cost, this option may be associated with a high user rating for the order.

In cases where the user is a frequent user and the missing item is a foundational item, the order quality model may generate a quality improvement action that would obtain the missing item if a cost for obtaining the missing item is low cost (e.g., below some threshold value). For example, if a second source location where the missing item is available is close to the source location and the cost for the picker to go to the second source location to obtain the missing item is relatively low, the order quality model may generate a quality improvement action where the item is obtained (similar to the case described above). Likewise, in cases where the user is a new user and the missing item is a nice to have item (i.e., not a foundational item), the order quality model may generate a quality improvement action that would obtain the missing item if a cost for obtaining the missing item is low cost (e.g., below some threshold value). Note in cases where the cost was too high, the order quality model may generate a quality improvement action where the missing item is not obtained and instead one or more appeasements are provided to the user.

In cases where the user is a frequent user and the missing item is a nice to have item, the order quality model may generate a quality improvement action that would provide one or more appeasements to the user in lieu of obtaining the missing item from a second source location. The appeasement may be, e.g., a refund on the cost associated with the missing item, and may also include a coupon, incentive, etc., for future use. As the user in this case is a frequent user and the item is not a foundational item, an appeasement is less likely to negatively affect the user's satisfaction with the order.

Figure 5:
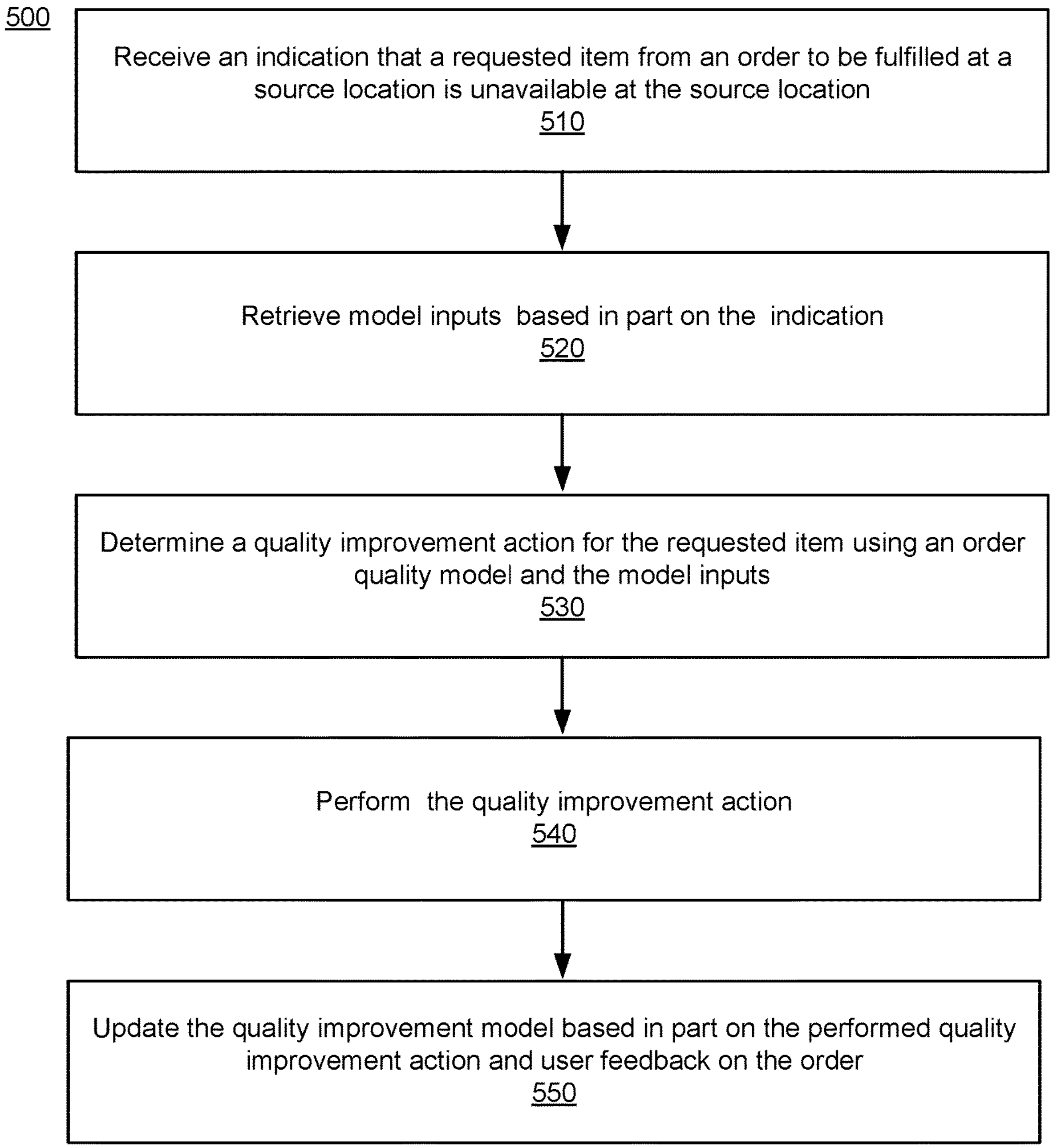
FIG. 5 is a flowchart for a method of using a machine learned model for determining quality improvement actions, in accordance with some embodiments.

FIG. 5 is a flowchart for a method of using a machine learned model for determining quality improvement actions, in accordance with some embodiments. Alternative embodiments may include more, fewer, or different steps from those illustrated in FIG. 5, and the steps may be performed in a different order from that illustrated in FIG. 5. These steps may be performed by an online system (e.g., online system 140). Additionally, each of these steps may be performed automatically by the online system without human intervention.

The online system receives 510 an indication that a requested item from an order to be fulfilled at a source location is unavailable at the source location. For example, a user may place the order with the online system, where the order includes one or more items to be obtained from the source location. The online system 140 assigns the order to a picker associated with a picker client device (e.g., the picker client device 110). The picker shops for the one or more items at the source location. In some embodiments, in the process of the shop, the picker discovers that the requested item is out of stock at the source location. In this embodiment, the picker client device provides the indication to the online system that the requested item is out of stock at the source location. In other embodiments, a source computing system (e.g., the retailer computing system 120) associated with the source location may provide the indication to the online system. For example, the source location may have had stock for the requested item when the order was placed, but ran out of stock after the order was placed.

The online system retrieves 520 model inputs based in part on the indication. The model inputs may include, e.g., availability information for the requested item at least one other source location, a foundational item status of the requested item, a tenure of the user, item data, source locations with a threshold distance to a delivery location for the order, cargo spaces available to pickers, cost of transporting the missing item, replacement item availability, some other input relevant to the order quality model, or some combination thereof.

The online system determines 530 a quality improvement action for the requested item using an order quality model and the model inputs. The order quality model may be a machine learned model that was trained by accessing a set of training examples including appeasement training data, picker fulfillment training data, user satisfaction training data, and user tenure training data. The order quality model may be applied to the set of training examples to generate a training output corresponding to a predicted quality improvement action. One or more error terms obtained from one or more loss functions may be back-propagated to update a set of parameters of the order quality model, and one or more of the error terms may be based on a difference between a label applied to a test interaction of the set of training examples and the predicted quality improvement action. The back-propagation may be stopped after the one or more loss functions satisfy one or more criteria.

The online system performs 540 the quality improvement action. The quality improvement action may be, e.g., instructing a second picker (via a picker client device associated with the second picker) to obtain the item from a different source location and adjusting the portion of the order to be fulfilled by the picker to include only the items that are available at the source location; instructing the picker to obtain the item from a different source location; or adjusting the portion of the order to be fulfilled by the picker to include only the items that are available at the source location and providing an appeasement to the user.

The online system updates 550 the quality improvement model based in part on the performed quality improvement action and user feedback on the order. For example, given an order where an item ended up not being available at a source location of the order, and a performance improvement action occurred. The online system may receive user feedback on the order. The online system may re-train the quality improvement model based in part on the performed quality improvement action and the user feedback. In this manner, the online system is able to fine tune the quality improvement model to mitigate loss of user satisfaction in cases where an item ends up being out of stock at the source location requested by the user.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a non-transitory computer readable medium, comprising:

receiving an indication from a picker client device that a requested item from an order to be fulfilled at a source location is unavailable at the source location, wherein the order is associated with a user;

retrieving model inputs based in part on the indication, wherein the model inputs include availability information for the requested item, at least one other source location, a foundational item status of the requested item, and a tenure of the user, wherein the foundational item status indicates whether the respective requested item is foundational item for the order based on other items in the order;

selecting a quality improvement action for the requested item based on an output of an order quality model applied to the model inputs, wherein the order quality model is a machine learning model that was trained by:

accessing a set of training examples including appeasement training data, picker fulfillment training data, user satisfaction training data, and user tenure training data, applying the order quality model to the set of training examples to generate a training output corresponding to a predicted quality improvement action, back-propagating one or more error terms obtained from one or more loss functions to update a set of parameters of the order quality model, and one or more of the error terms are based on a difference between a label applied to a test interaction of the set of training examples and the predicted quality improvement action, and stopping the back-propagation after the one or more loss functions satisfy one or more criteria; and performing the quality improvement action.

2. The method of claim 1, wherein determining the quality improvement action for the requested item using the order quality model and the model inputs, further comprises:

generating a plurality of quality improvement actions that each have a respective quality score, wherein a quality score for a given quality improvement action is based on a cost to perform the given quality improvement action and a predicted user satisfaction for performing the given quality improvement action;

ranking the plurality of quality improvement actions based in part on their respective quality score; and selecting the quality improvement action based in part on the ranking.

3. The method of claim 1, wherein performing the quality improvement action comprises:

identifying a second source location where the requested item is available;

selecting a second picker to obtain the requested item; and providing instructions to a second picker client device for a second picker associated with the second picker client device to fulfill the order for the requested item at the second source location.

4. The method of claim 3, wherein the second picker client device is the picker client device.

5. The method of claim 3, wherein identifying the second source location where the requested item is available, comprises:

determining availability of the requested item at a first source location that is part of a same retailer as the source location;

determining availability of the requested item at a second source location that is not part of the retailer;

weighting the first source location more than the second source location;

adjusting the weighting of the first source location and the weighting of the second source location based on their respective locations from a delivery location for the order; and selecting the source location from the first source location and the second source location based on the adjusted weightings.

6. The method of claim 1, further comprising:

determining the foundational item status for the requested item using a foundational item model and items of the order, wherein the foundational item model is a machine learning model that determines what items are essential to an order based on other items in the order.

7. The method of claim 1, further comprising:

receiving user feedback on the order; and updating the quality improvement model based in part on the performed quality improvement action and the user feedback.

8. The method of claim 1, further comprising:

determining replacement item availability using a replacement model to identify items that are suitable to replace the requested item and are available at the source location, wherein the model inputs further include the determined replacement item availability.

9. The method of claim 1, wherein the order is a first order, the method further comprising:

receiving a second order for the source location that includes the requested item;

determining the foundational item status for the requested item of the first order using a foundational item model and items of the first order, wherein the foundational item model is a machine learning model that determines what items are essential to an order based on other items in the order, and the foundational item status indicates that the requested item is a foundational item for the first order;

determining a second foundational item status for the requested item of the second order using the foundational item model and items of the second order, wherein the second foundational item status indicates that that the requested item is not a foundational item for the second order; and prioritizing fulfillment of the requested item for the first order over fulfillment of the requested item for the second order based in part on the foundational item status of the requested item in the first order and the foundational item status of the requested item in the second order.

10. The method of claim 9, wherein performing the quality improvement action comprises:

identifying a second source location where the requested item is available;

reserving a unit of the requested item for the first order at the second source location where it is available; and providing instructions to the picker client device for a picker associated with the picker client device to fulfill the order for the requested item at the second source location.

11. A computer program product comprising a non-transitory computer readable storage medium having instructions encoded thereon that, when executed by a processor of a computer system, cause the computer system to perform steps comprising:

receiving an indication from a picker client device that a requested item from an order to be fulfilled at a source location is unavailable at the source location, wherein the order is associated with a user;

retrieving model inputs based in part on the indication, wherein the model inputs include availability information for the requested item, at least one other source location, a foundational item status of the requested item, and a tenure of the user, wherein the foundational item status indicates whether the respective requested item is foundational item for the order based on other items in the order;

selecting a quality improvement action for the requested item based on an output of an order quality model applied to the model inputs, wherein the order quality model is a machine learning model that was trained by:

accessing a set of training examples including appeasement training data, picker fulfillment training data, user satisfaction training data, and user tenure training data, applying the order quality model to the set of training examples to generate a training output corresponding to a predicted quality improvement action, back-propagating one or more error terms obtained from one or more loss functions to update a set of parameters of the order quality model, and one or more of the error terms are based on a difference between a label applied to a test interaction of the set of training examples and the predicted quality improvement action, and stopping the back-propagation after the one or more loss functions satisfy one or more criteria; and performing the quality improvement action.

12. The computer program product of claim 11, where the encoded instructions to determine the quality improvement action for the requested item using the order quality model and the model inputs further comprises instructions that when executed cause the computer system to:

generating a plurality of quality improvement actions that each have a respective quality score, wherein a quality score for a given quality improvement action is based on a cost to perform the given quality improvement action and a predicted user satisfaction for performing the given quality improvement action;

ranking the plurality of quality improvement actions based in part on their respective quality score; and selecting the quality improvement action based in part on the ranking.

13. The computer program product of claim 11, where the encoded instructions to perform the quality improvement action further comprises instructions that when executed cause the computer system to perform steps comprising:

identifying a second source location where the requested item is available;

selecting a second picker to obtain the requested item; and providing instructions to a second picker client device for a second picker associated with the second picker client device to fulfill the order for the requested item at the second source location.

14. The computer program product of claim 13, wherein the second picker client device is the picker client device.

15. The computer program product of claim 13, where the encoded instructions to identify the second source location where the requested item is available further comprises instructions that when executed cause the computer system to perform steps comprising:

determining availability of the requested item at a first source location that is part of a same retailer as the source location;

determining availability of the requested item at a second source location that is not part of the retailer;

weighting the first source location more than the second source location;

adjusting the weighting of the first source location and the weighting of the second source location based on their respective locations from a delivery location for the order; and selecting the source location from the first source location and the second source location based on the adjusted weightings.

16. The computer program product of claim 11, further comprising encoded instructions that when executed cause the computer system to perform steps comprising:

determining the foundational item status for the requested item using a foundational item model and items of the order, wherein the foundational item model is a machine learning model that determines what items are essential to an order based on other items in the order.

17. The computer program product of claim 11, further comprising encoded instructions that when executed cause the computer system to perform steps comprising:

receiving user feedback on the order; and updating the quality improvement model based in part on the performed quality improvement action and the user feedback.

18. The computer program product of claim 11, further comprising encoded instructions that when executed cause the computer system to perform steps comprising:

determining replacement item availability using a replacement model to identify items that are suitable to replace the requested item and are available at the source location, wherein the model inputs further include the determined replacement item availability.

19. The computer program product of claim 11, wherein the order is a first order, and the computer program product further comprises encoded instructions that when executed cause the computer system to perform steps comprising:

receiving a second order for the source location that includes the requested item;

determining the foundational item status for the requested item of the first order using a foundational item model and items of the first order, wherein the foundational item model is a machine learning model that determines what items are essential to an order based on other items in the order, and the foundational item status indicates that the requested item is a foundational item for the first order;

determining a second foundational item status for the requested item of the second order using the foundational item model and items of the second order, wherein the second foundational item status indicates that that the requested item is not a foundational item for the second order; and prioritizing fulfillment of the requested item for the first order over fulfillment of the requested item for the second order based in part on the foundational item status of the requested item in the first order and the foundational item status of the requested item in the second order.

20. A computer system comprising:

a processor; and a non-transitory computer readable storage medium having instructions encoded thereon that, when executed by the processor, cause the processor to perform steps comprising:

receiving an indication from a picker client device that a requested item from an order to be fulfilled at a source location is unavailable at the source location, wherein the order is associated with a user, retrieving model inputs based in part on the indication, wherein the model inputs include availability information for the requested item, at least one other source location, a foundational item status of the requested item, and a tenure of the user, wherein the foundational item status indicates whether the respective requested item is foundational item for the order based on other items in the order, selecting a quality improvement action for the requested item based on an output of an order quality model applied to the model inputs, wherein the order quality model is a machine learning model that was trained by:

accessing a set of training examples including appeasement training data, picker fulfillment training data, user satisfaction training data, and user tenure training data, applying the order quality model to the set of training examples to generate a training output corresponding to a predicted quality improvement action, back-propagating one or more error terms obtained from one or more loss functions to update a set of parameters of the order quality model, and one or more of the error terms are based on a difference between a label applied to a test interaction of the set of training examples and the predicted quality improvement action, and stopping the back-propagation after the one or more loss functions satisfy one or more criteria, and performing the quality improvement action.

* * * * *